United States Patent [19]
Coffin et al.

[11] Patent Number: 5,991,429
[45] Date of Patent: Nov. 23, 1999

[54] FACIAL RECOGNITION SYSTEM FOR SECURITY ACCESS AND IDENTIFICATION

[76] Inventors: Jeffrey S. Coffin, 6009 Fairfield La., Sykesville, Md. 21784; Darryl Ingram, 5444 Ring Dove La., Columbia, Md. 21044

[21] Appl. No.: 08/759,708

[22] Filed: Dec. 6, 1996

[51] Int. Cl.$^6$ .............................. G06K 9/32; G06K 9/46
[52] U.S. Cl. ........................................................ 382/118
[58] Field of Search .................................... 382/115, 116, 382/118, 124, 218; 345/968; 434/155; 902/3, 6; 340/573; 707/3, 6, 104

[56] References Cited

U.S. PATENT DOCUMENTS

| | | | |
|---|---|---|---|
| 3,611,290 | 10/1971 | Luisi et al. | 340/146.3 |
| 3,805,238 | 4/1974 | Rothfjell | 340/146.3 |
| 4,135,147 | 1/1979 | Riganati et al. | 340/146.3 |
| 4,300,160 | 11/1981 | Pusch et al. | 358/113 |
| 4,521,861 | 6/1985 | Logan et al. | 364/517 |
| 4,525,859 | 7/1985 | Bowles et al. | 382/5 |
| 4,646,352 | 2/1987 | Asai et al. | 382/5 |
| 4,699,149 | 10/1987 | Rice | 128/664 |
| 4,858,000 | 8/1989 | Lu | 358/84 |
| 4,876,725 | 10/1989 | Tomko | 382/4 |
| 4,975,969 | 12/1990 | Tal | 382/2 |
| 5,027,413 | 6/1991 | Barnard | 382/1 |
| 5,072,120 | 12/1991 | Siewick | 250/330 |
| 5,107,117 | 4/1992 | Ennenga et al. | 250/334 |
| 5,163,094 | 11/1992 | Prokoski et al. | 382/2 |
| 5,450,504 | 9/1995 | Calia | 382/118 |
| 5,553,155 | 9/1996 | Kuhns et al. | 382/115 |
| 5,615,277 | 3/1997 | Hoffman | 382/115 |
| 5,627,616 | 5/1997 | Sergeant et al. | 354/81 |
| 5,689,247 | 11/1997 | Welner | 340/825.31 |
| 5,835,616 | 11/1998 | Lobo et al. | 382/118 |

OTHER PUBLICATIONS

Gilbert, Jeffrey M. and Yang, Woodward, "A Real–Time Face Recognition System Using Custom VLSI Hardware"—Harvard University, Nov. 1993.

Moghaddam, Baback and Pentland, Alex; "Face Recognition Using View–Based and Modular Eigenspaces"—M.I.T. Media Laboratory Perceptual Computing Section Technical Report No. 301; Appeared in *Automatic Systems for the Identification and Inspection of Humans,*, SPIE VO. 2277, Jul. 1994.

*Primary Examiner*—Leo H. Boudreau
*Assistant Examiner*—Brian P. Werner
*Attorney, Agent, or Firm*—Laubscher & Laubscher

[57] ABSTRACT

A method and apparatus for identifying individuals for the purposes of determining clearance access or surveillance is characterized by enrolling an image of a person's face either voluntarily or secretly to be later used for comparison when the person voluntarily desires clearance or is covertly detected. The system can recognize or identify individuals regardless of whether the individual is wearing eye glasses or attempted disguises. In one embodiment, the system allows an authorized operator to enroll an image of a person through a facial scan for subsequent clearance access. The system records the camera positioning, captures an image, scales the image and records data from a region of interest within the scanned image to a database for later comparison. Enrollment data and the corresponding image information are then associated with a personal identification number assigned to the person. Upon presentment before the system, and entering the assigned personal identification number, another facial scan is taken of the person to be compared with the data from the regions of interest from the enrollment database of images to confirm the identity of the individual. In a second embodiment, the system operator injects an image secretly taken of an individual for later surveillance and identification. In a surveillance mode, the system automatically detects a person's presence, positions the camera through analysis of the image, captures an image, and then processes the image to determine if the person is enrolled in the enrollment database.

6 Claims, 9 Drawing Sheets

FACIAL RECOGNITION SYSTEM FOR SECURITY ACCESS AND IDENTIFICATION

BACKGROUND OF THE INVENTION

Biometric techniques for determining the identity of individuals, such as in security applications, have been well known and in use for some time. To date, biometric techniques have primarily been oriented towards fingerprint analysis rather than the visual recognition of facial images. Identification using infrared thermal imaging has been a more recent phenomena. For example, Rice, in U.S. Pat. No. 4,699,149, taught the scanning of subcutaneous blood vessels by measuring the inflection of incident radiation as a technique for determining a person's identification signature. However, active heating of the area being scanned was required in order to get an accurate scan. More recently, the Prokcski et al. patent, U.S. Pat. No. 5,163,094, moved the infrared field forward by describing a method and apparatus for identifying individuals characterized by analyzing elemental shapes from thermally derived biosensor data. Thermal images are converted into digital representations by measuring the intensity of each pixel corresponding to the level of thermal energy for a corresponding portion of the image. Following standardization, an image containing the elemental shapes can be compared and then correlated with unique structural features of an individual.

However, several aspects of the systems have not been dealt with: automatically positioning a camera or other, biosensor, enhancing identification accuracy through class sorting, and identifying individual facial features from those subjects wearing eyeglasses.

SUMMARY OF THE INVENTION

To overcome the above-noted issues, it is a primary object of the present invention to provide a method and apparatus for enrolling and identifying individuals for clearance access based upon computer matching of a region of interest in a facial image scan. In particular, the present invention utilizes a personal identification number which is assigned to each enrolled individual. The personal identification number identifies a location in a database containing camera positioning information, clearance data and the reference facial image scan. Upon entering the personal identification number and standing before the system, a scan image is taken and processed for comparison with the enrollment image.

According to another object of the invention, a method and apparatus are provided that can survey a premises and immediately detect and identify particular unwanted persons, such as known terrorists or fugitives.

A further object of this invention is to provide a facial image processing method used in identification both for clearance access and surveillance. The method involves capturing an image, locating the head in memory space, scaling and normalizing the image and extracting a region of interest. In a further embodiment of the invention, the center of the face is detected for further accuracy even if the person has facial hair or wears glasses.

Correlation techniques compare previously processed image information with a presently scanned image to confirm or generate the identity of an individual. In a further embodiment, the correlation technique in a clearance access mode correlates a sorted list of possible matches with an entered personal identification number. The system can also sort the information by a previously defined class. In a further embodiment, the correlation technique in a surveillance mode can generate a goodness of fit or likelihood factor that the person detected is the known terrorist or fugitive whose image data was enrolled into the system.

BRIEF DESCRIPTION OF THE FIGURES

Other objects and advantages of the invention will become apparent from a study of the following specification when viewed in the light of the accompanying drawings, in which.

DETAILED DESCRIPTION

Figure 9:
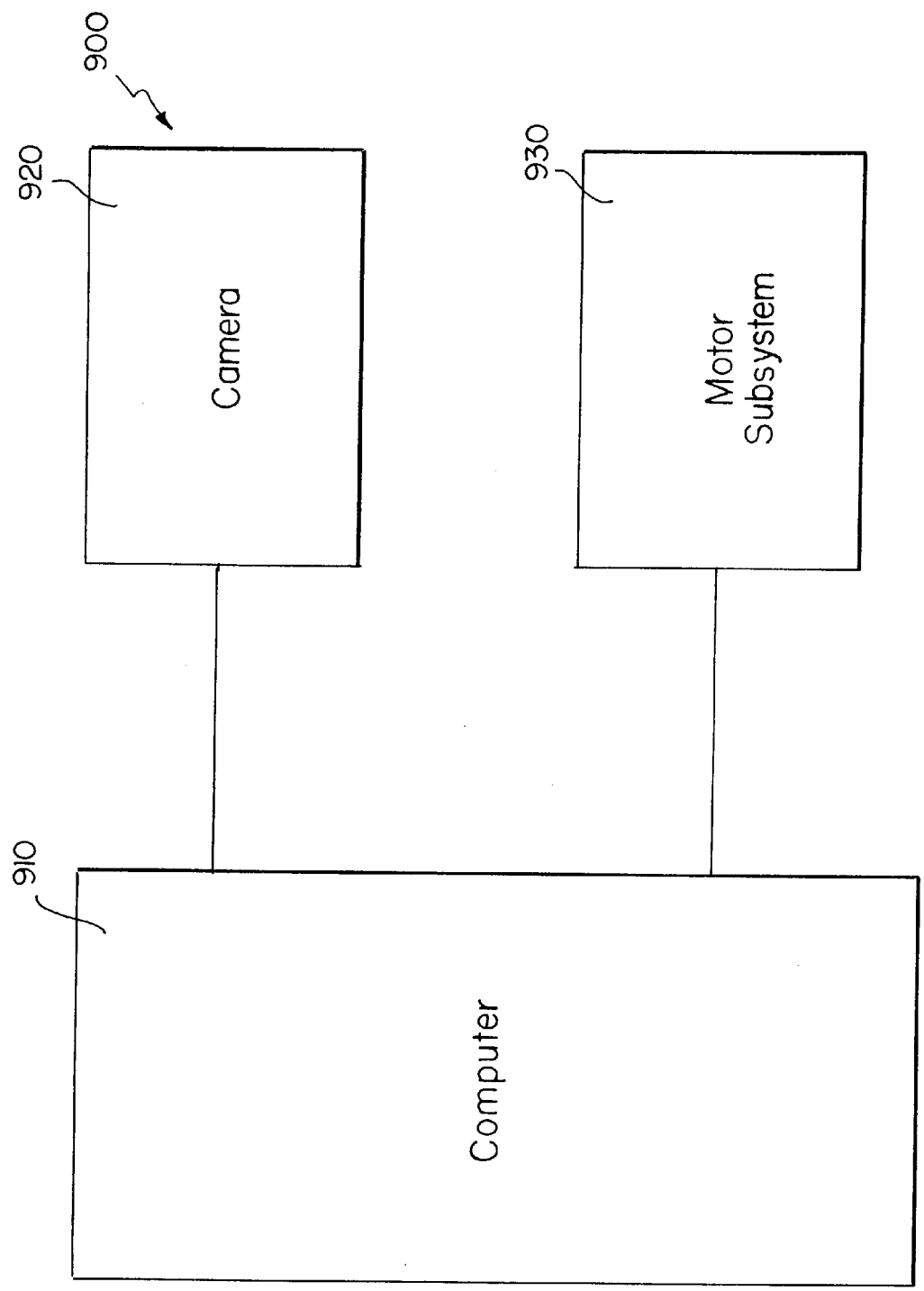
FIG. 9 is a block diagram of a facial recognition system according to one embodiment of the present invention.

The invention relates to a method and apparatus for identifying individuals for the purposes of determining clearance access or for surveillance through a facial recognition system 900, as shown in FIG. 9. The facial recognition system 900 is comprised of a stand-alone camera 920 for taking a facial scan or image of a person and a separate computer 910 for image processing and database management.

The facial recognition system is operated in the enrollment mode and the clearance access mode solely at the direction of an authorized operator or system administrator. The options presented to the system administrator will be described with reference to FIG. 1.

Figure 1:
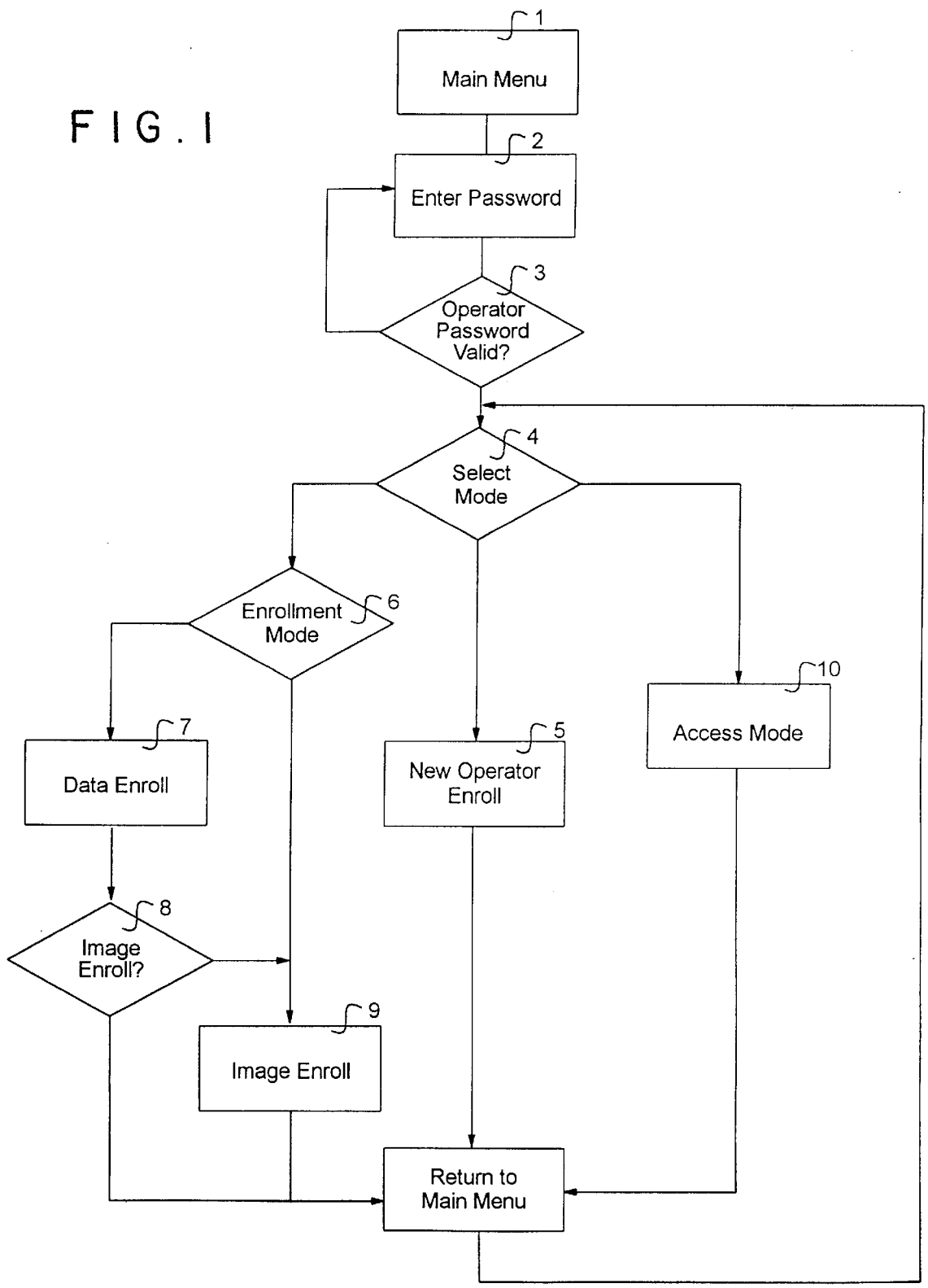
FIG. 1 is a flow chart illustrating the steps for operating the facial recognition system to enroll data, images or new operators and to use the system to determine clearance access.

Specifically, in FIG. 1, upon successful computer initialization, the operator is presented with a main menu at step 1 which allows for interaction with the system. The operator is first queried to enter a password at step 2, the successful completion of which logs the operator or system administrator into the system. The password may be designated to give the operator a certain level of authority which allows the operator to only perform certain functions. As an example, a password may qualify an operator to use the system to identify and verify for clearance, but not allow the operator to enroll more persons into the database..

Depending upon the level of responsibility assigned to the operator password, an operator may have the option at step 4 to enroll a new operator at step 5. Upon entering the relevant data, a new password will be assigned to a new operator consistent with the appropriate level of authority and responsibility for that operator. After enrollment, the system may be returned to the selection mode at step 4 within the main menu.

Again depending upon the level of responsibility assigned to the operator password, the operator may have the option at step 4 to enter the enrollment mode or the access mode. In the enrollment mode at step 6, the operator can choose to enroll new data at step 7 or new images of persons already in the database or unknown to the system at step 9. When the operator enrolls new data at step 7, the system provides the option at step 8 of adding a new image.

After persons are enrolled in the system database, the system may be placed into the access mode at step 10 to scan facial images to determine or confirm their identity with the reference data and images. This can be used in applications such as the entrance point to a secured laboratory or company. If the operator wishes to exit the access mode, the system provides the option to return to the selection mode at step 4 within the main menu.

Figure 2:
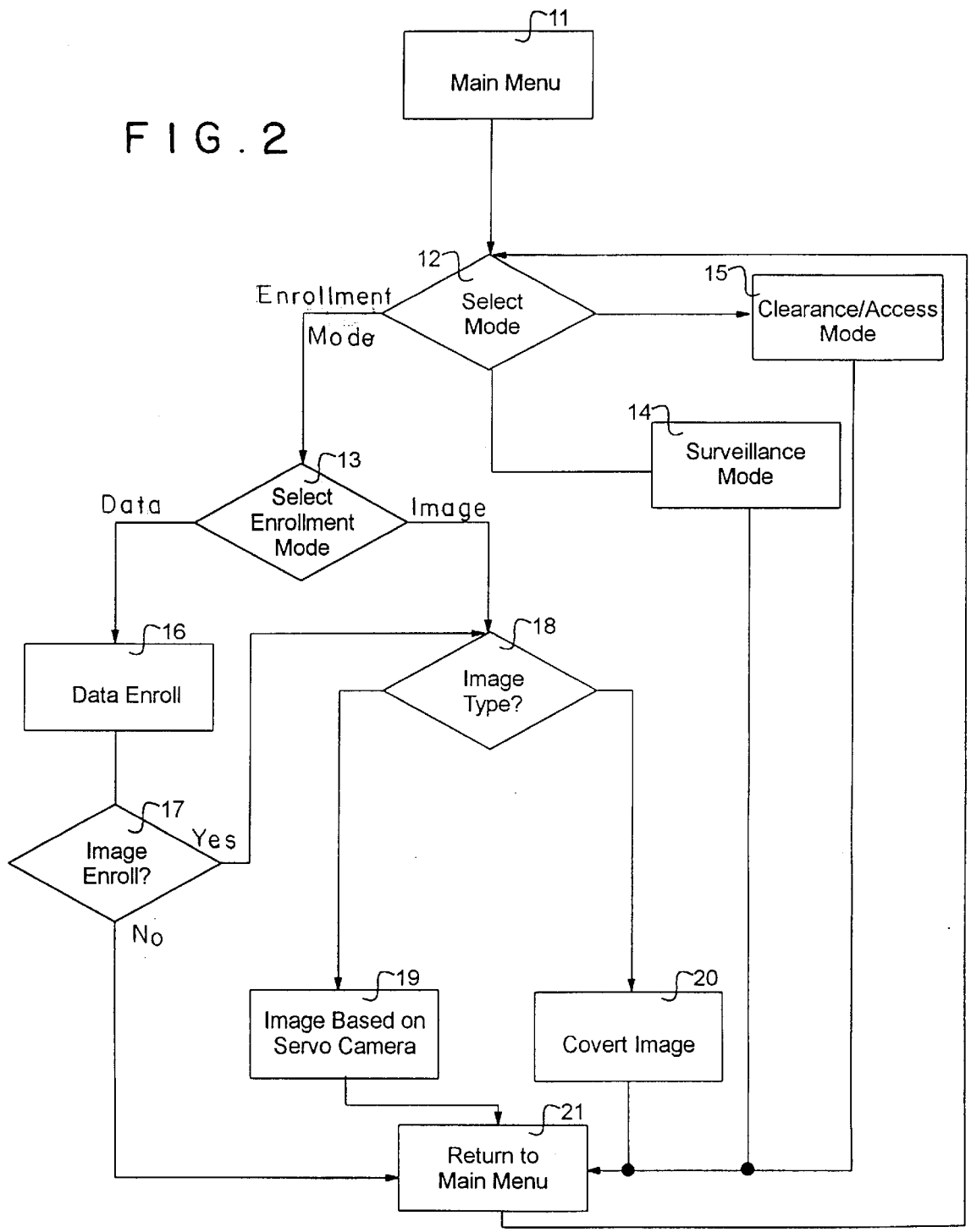
FIG. 2 is a flow chart illustrating a second embodiment of the basic steps for operating the facial recognition system which adds an identification mode for surveillance and detection based upon covert images.

The options presented to the system administrator in a second embodiment will be described with reference to FIG. 2. This embodiment provides for an additional feature of operation in a surveillance or covert mode.

The main menu is presented at step 11. Depending upon the level of responsibility attributed to the password, the operator has the option to select at step 12 the enrollment mode (step 13), the access mode (step 15) or the surveillance/identification mode (step 14). In the enrollment mode at step 13, the operator can choose to enroll new data (step 16) or new images (step 18) regarding a person already in the database or unknown to the system. If the operator enrolls new data at step 16, the system provides he option of adding a new image at step 17. If a new image is to be enrolled, the operator is prompted to choose an image type at step 18. An image used for the clearance access mode is generated from the servo camera connected with the system at step 19. The operator may also inject an image taken secretly or for use in a covert operation for surveillance at step 20. After enrollment, the system returns at step 21 to the selection mode at step 12.

The operator may choose the clearance/access mode (step 15). After persons are enrolled in the system database, the operator places the system in the access mode to scan facial images to determine or confirm their identity with the reference data and images. This can be used in applications such as the entrance point to a secured laboratory or company. If the operator wishes to exit the access mode at step 15, the system can be returned at step 21 to the selection mode at step 12 within the main menu.

The operator has the further choice to place the system in the surveillance identification mode (step 14). After persons are enrolled in the system database, the operator uses the surveillance mode to detect the presence of known offenders, such as terrorists or fugitives, as desired by the system design. If the operator wishes to exit the surveillance mode at step 14, the system will then return at step 21 to the selection mode at step 12 within the main menu.

Figure 3:
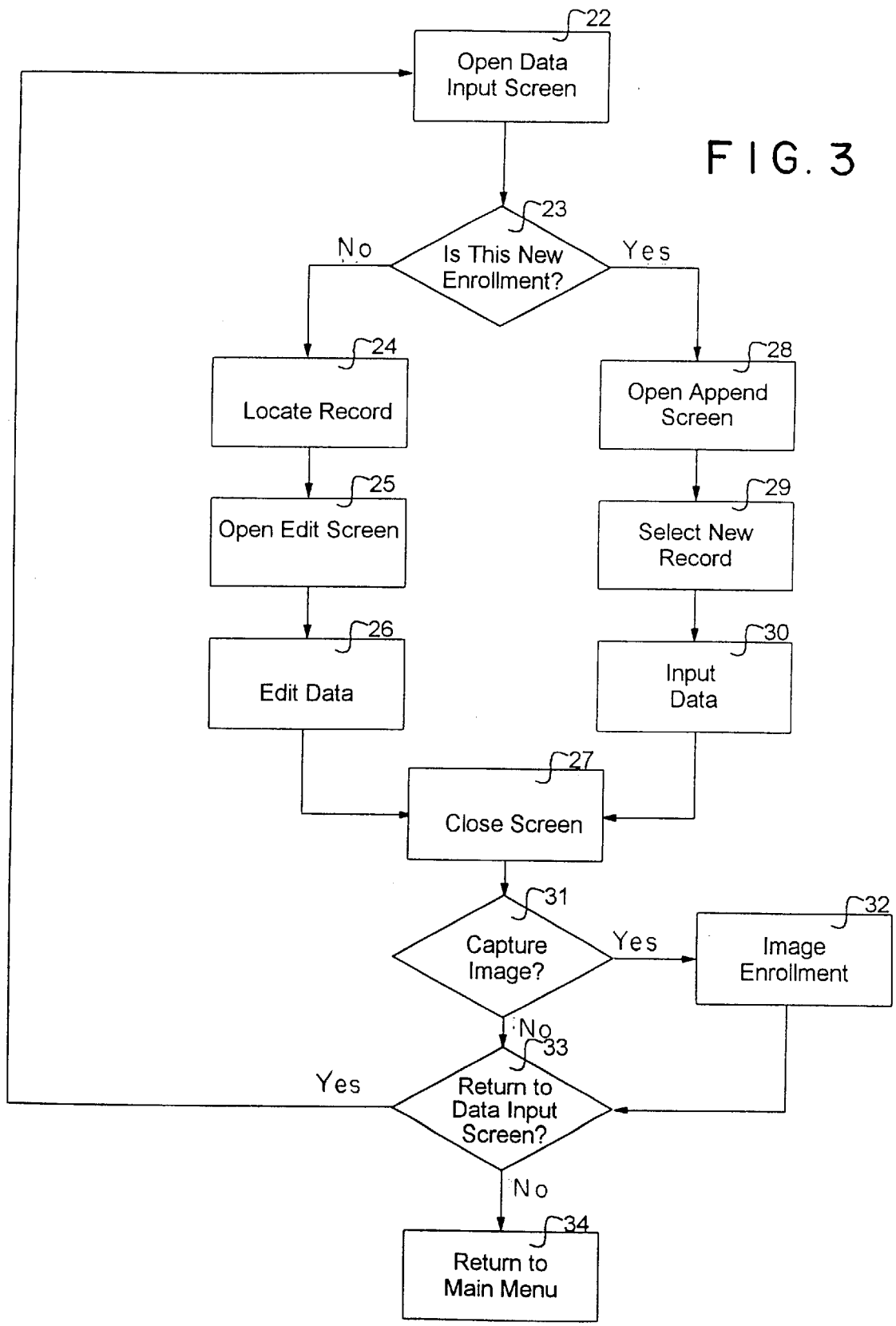
FIG. 3 is a flow chart illustrating enrollment of demographic data either by entering new records or editing previously existing records.

The enrollment of data as set forth in step 6 of FIG. 1 will be described in further detail with reference to FIG. 3. Upon entering the open data input screen at step 22, the operator then chooses at step 23 whether to add a new person to the system or edit demographic data of a person already present in the database. To edit an existing data record, the operator queries the system to locate the record at step 24 and opens an edit screen at step 25 according to the database configuration used. Any conventional database configuration can be used in the present invention. The operator can then edit the desired data at step 26 and close the data input screen at step 27.

If the operator chooses to add a new record, the system opens an append record screen at step 28 and prompts the operator to select a new record at step 29. The operator can then add all relevant data at step 30, such as the full name, address or social security number, and clearance level. The operator can then close the data input screen at step 27.

Figure 4:
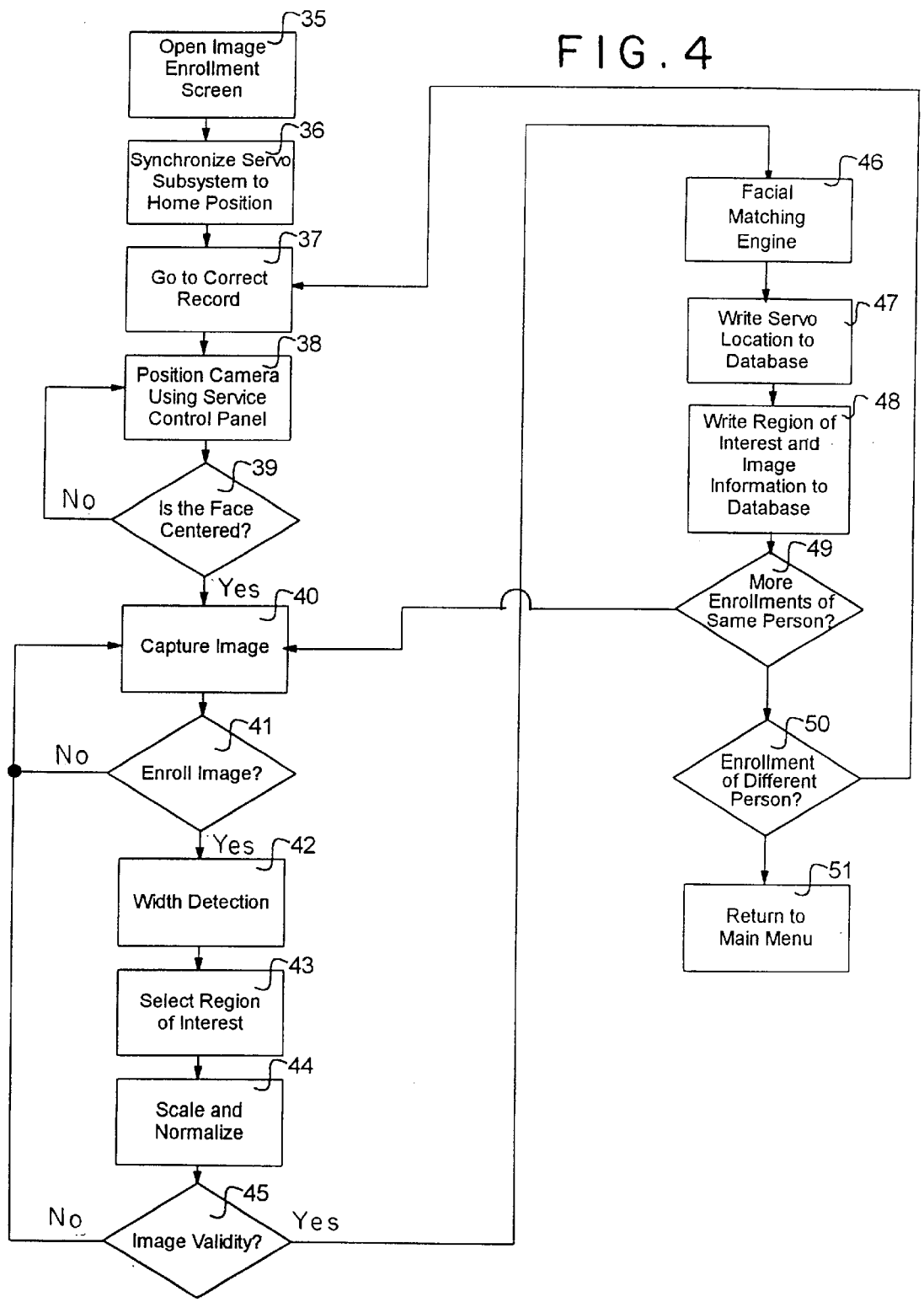
FIG. 4 is a flow chart illustrating enrollment of a facial image to be used with the clearance access mode.

If the operator chooses Lo capture a new image at step 31, the system automatically prompts the operator to enroll a new image in to the system at step 32 by entering the image enrollment mode, which is described in FIG. 4. If the image enrollment is complete or the operator chooses not to enter the image enrollment mode, the system then allows the operator to return to the data input screen at step 33 or return to the main menu 34.

Figure 6:
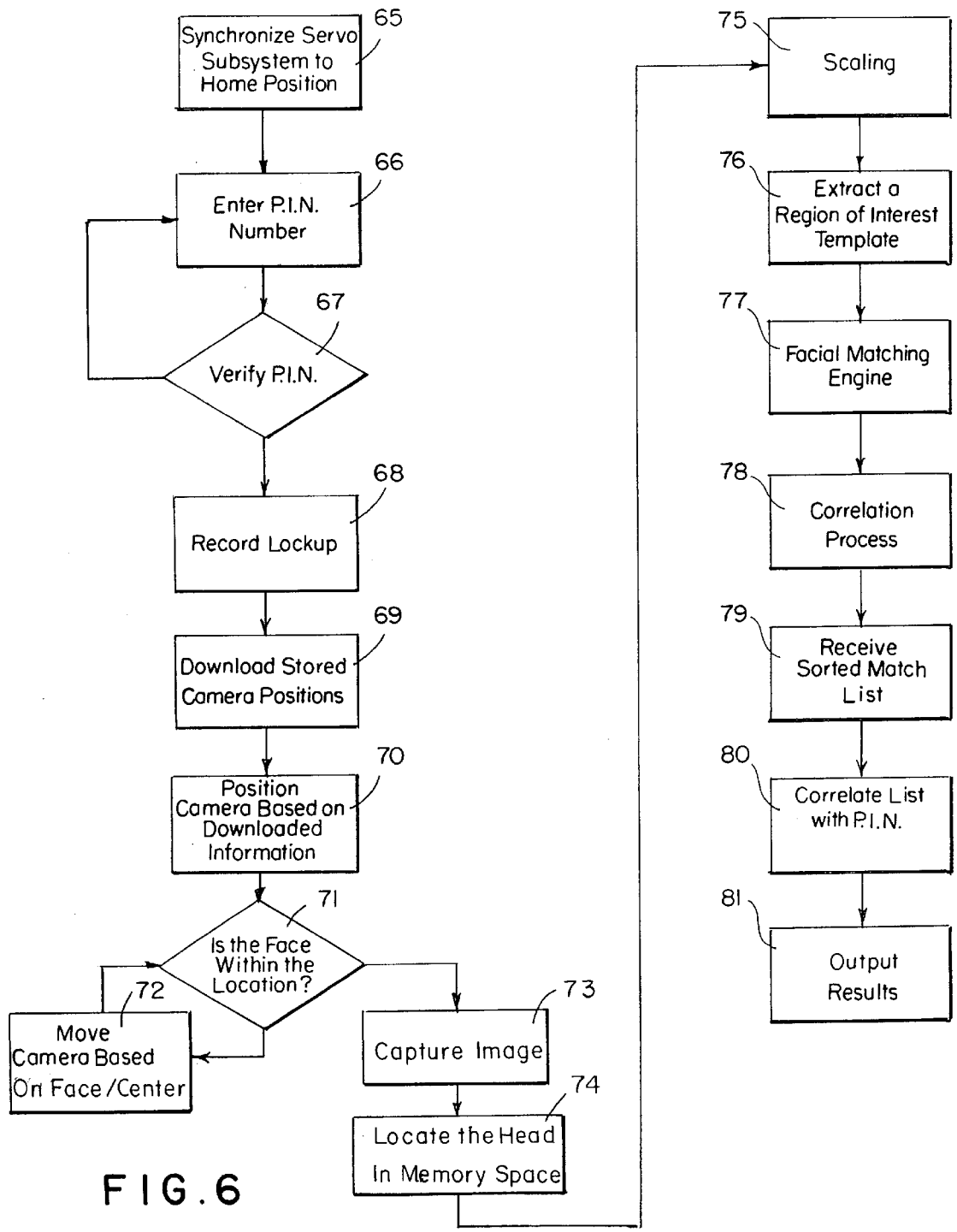
FIG. 6 is a flow chart illustrating the steps for identifying an individual for clearance access based upon a scanned facial image and an assigned personal identification number.
Figure 7:
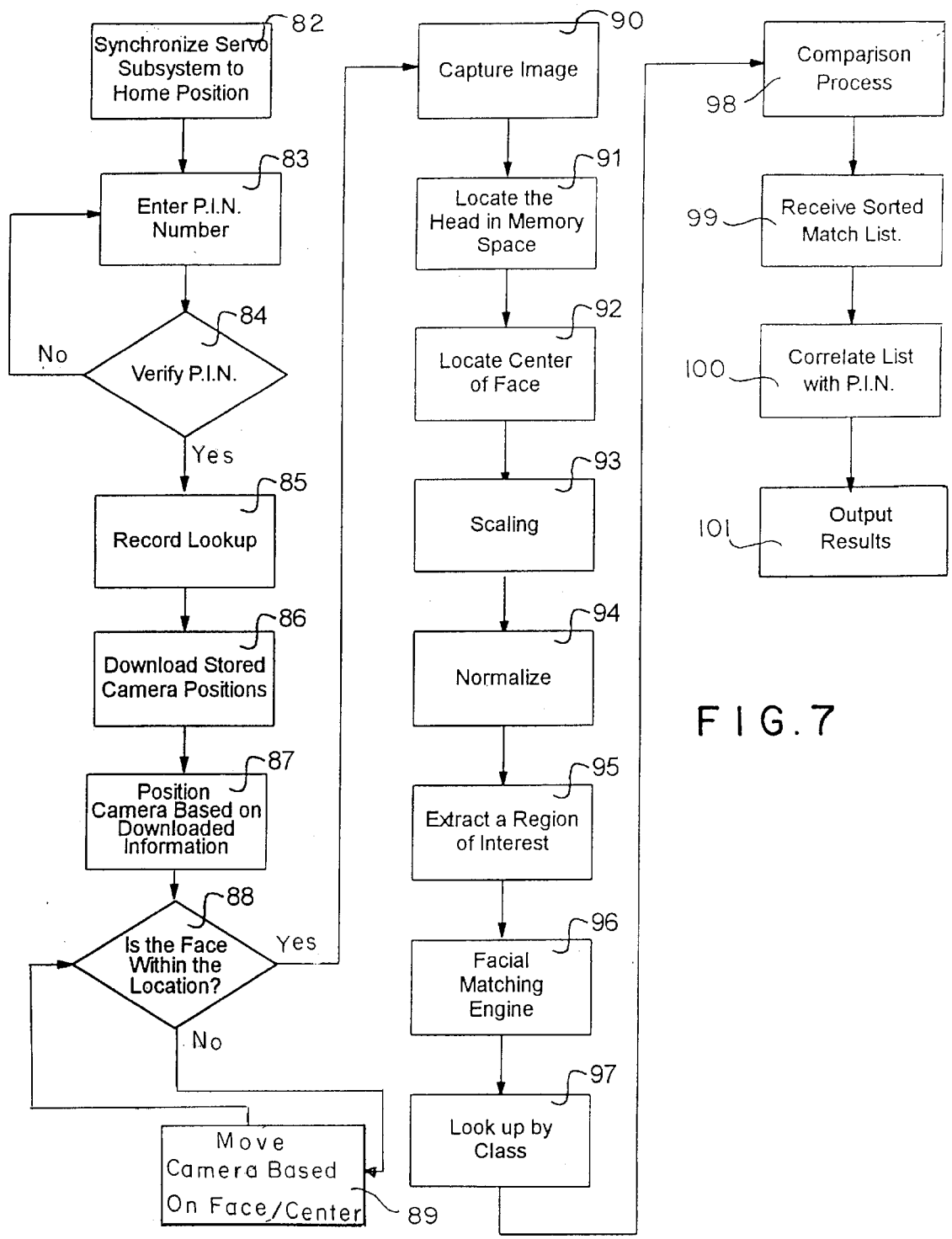
FIG. 7 is a flow chart illustrating a second embodiment of the steps for identifying an individual for clearance access which uses centering of face step and class sorting and doping techniques.
Figure 8:
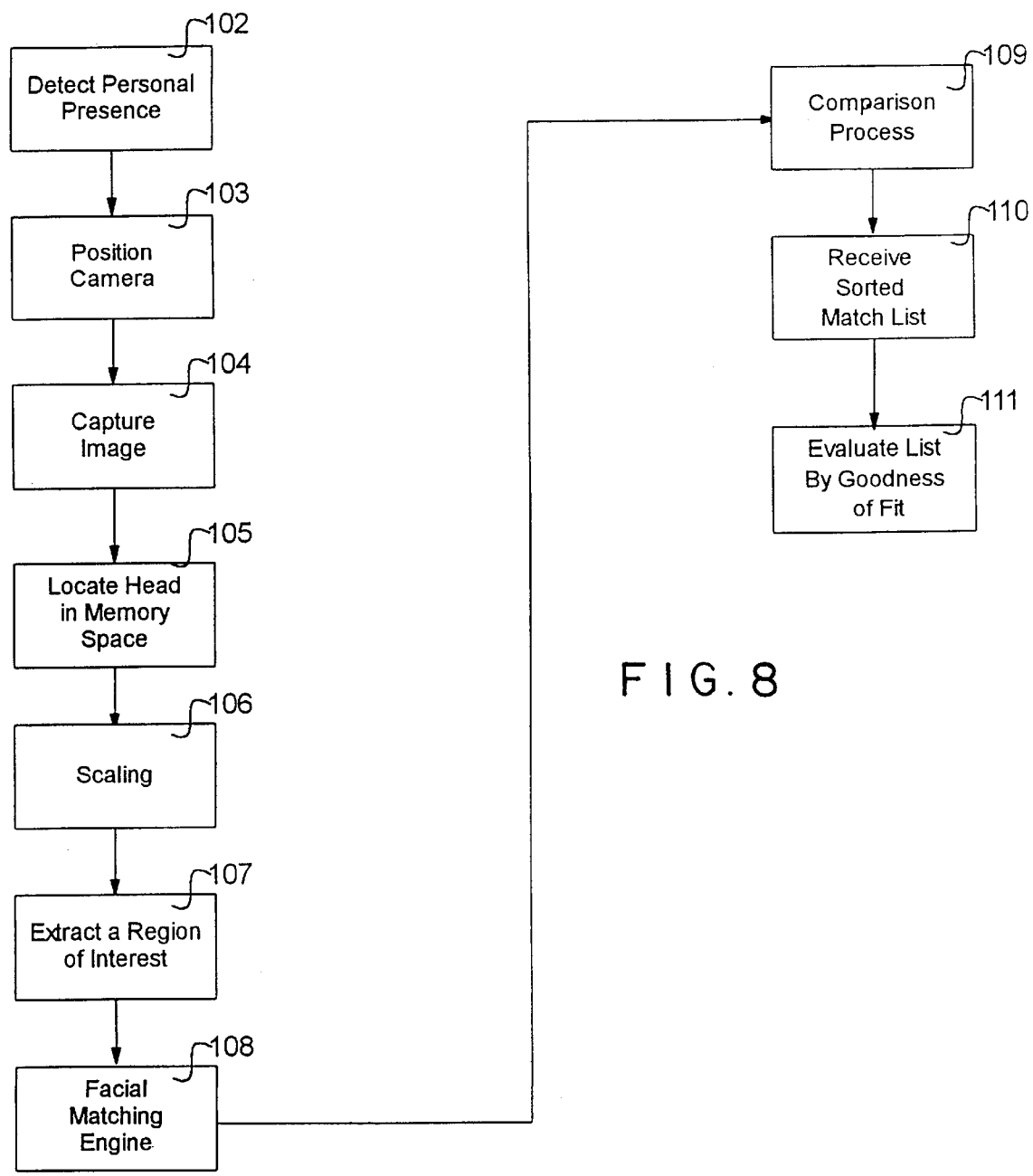
FIG. 8 is a flow chart illustrating the steps for identifying an individual based upon surveillance detection and comparison with enrollment information of a covert image.

In a further embodiment, the operator may wish to enter into the system data and images of persons who are not expected to utilize the facial recognition system for access or surveillance in order to further improve the reliability of the clearance access or surveillance modes shown in FIGS. 6, 7 and 8. The effect of "doping" the class by adding these records will be further discussed in reference to the clearance access mode.

The enrollment of an image for use in the clearance access mode will be described in further detail with reference to FIG. 4.

Upon opening the image enrollment screen at step 35, a signal is generated from the system to cue a servo motor subsystem 930 for the camera to a default position at step 36. The servo motor sub-assembly is described in further detail in U.S. Pat. No. 5,768,647 the discussion of which is hereby incorporated by reference. The camera that scans the facial image is supported by the servo motor assembly which can adjust upward and downward in order to compensate for differences in subject height. The operator then selects the proper record in the database corresponding to image to be stored at step 37. The subject stands before the camera at a predetermined distance as the operator positions the camera by sending commands through the system to the servo motor assembly at step 38. The operator continues to adjust the angles of the camera until the face of the subject is centered in an operator computer screen displaying a digital representation of the output of the camera at step 39. Upon the operator's command, the system then captures at step 40 an image of the subject and displays the digital representation as a still image on the operator's computer screen. At this point, if the face is not reasonably centered on the screen or the servo motor on the camera assembly is set incorrectly, the operator can opt to discard the image, reposition the servo and capture another image at step 40.

If the operator selects enroll image at step 41, the system then processes the image. The image is first adjusted through a width detection unit at step 42. A region of interest is then selected at step 43. The region of interest is a portion of the facial image to be scanned and utilized for later comparison. If the scanned image is produced by a thermal infrared camera, the region of interest is comprised of a set of two thermal differences in a small area across the face. The size of the region of interest is determined according to the level or sensitivity required by the facial recognition system. A larger region of interest results in greater accuracy, but requires a larger scan area. Persons with eye glasses and a beard or mustache may limit the possible size of the region of interest. Accordingly, a smaller, suboptimal region of interest may be necessary.

The system then scales, shifts and normalizes the region of interest at step 44 to account for inevitable differences in distance from the camera and head tilt. By scaling, shifting and normalizing the image to compensate for these differences, the facial recognition system can identify persons in the clearance access mode even if their stance before the camera has changed since their image was enrolled.

The system determines whether the information gathered from the image scan is acceptable for processing. If the image is found to be invalid at step 45, the operator returns the system to capture another image at step 40.

The region of interest is then input to the facial matching engine at step 46. One skilled in the art will appreciate that many facial matching engines are available. One example of a facial matching engine, developed by Lockheed Martin, utilizes a modified Huff transform. Dr. Pentland at the Massachusetts Institute of Technology laboratories developed a facial matching engine which compares images through Eigen values. Dr. Woodward Yang at Harvard University has developed a facial matching engine in which a set of different correlations are made to produce a sorted table. Another product, Fast Pattern Recognizer developed by Fast Pattern Recognizer, Inc. uses an optical correlator system. In that system, a correlation engine performs a mathematical transform and an optical correlation. Additionally, other systems are available which compare data through Artificial Intelligence and fuzzy logic algorithms.

The operation and type of data stored by these different engines varies. For example, some facial matching engines directly compare visual, infrared, or other types of images. Other facial matching engines produce templates, vector maps or other types of signatures from images which are then used for comparison. The term image information is used to refer to whatever kind of data is used and/or stored by the particular facial matching engine selected for the system. It will also be appreciated that some facial matching engines perform a comparison between image information, while others do not, requiring the user to perform the comparison separately using conventional techniques.

The servo motor location for the camera is written to the database location associated with the person to be enrolled at step 47. The location of the region of interest and the image information are written to the database at step 48.

The operator may then choose to enroll more image information for the same person at step 49. The system works nominally with image information from three images of a person in clearance access mode. If the operator chooses to enroll more image information for the same person, the system immediately begins to scan images for the operator to capture at step 40 without repositioning the camera. Position is fixed based on the settings from the first image enrollment. This is done because the height of the person whose image is to be recaptured should not change more than an amount accepted within the system tolerances. System tolerances are selected to account for height changes such as those caused by a person wearing high heels rather than flat shoes.

The operator may choose to enroll image information for a different person at step 50. If the operator does choose to enroll image information for an additional person for the database, the system accesses the proper database record at step 37 and allows the operator to adjust and position the camera using the service control panel at step 38 to prepare for capturing an image. When the image information enrollment process is complete, the system returns at step 51 to the main menu.

Figure 5:
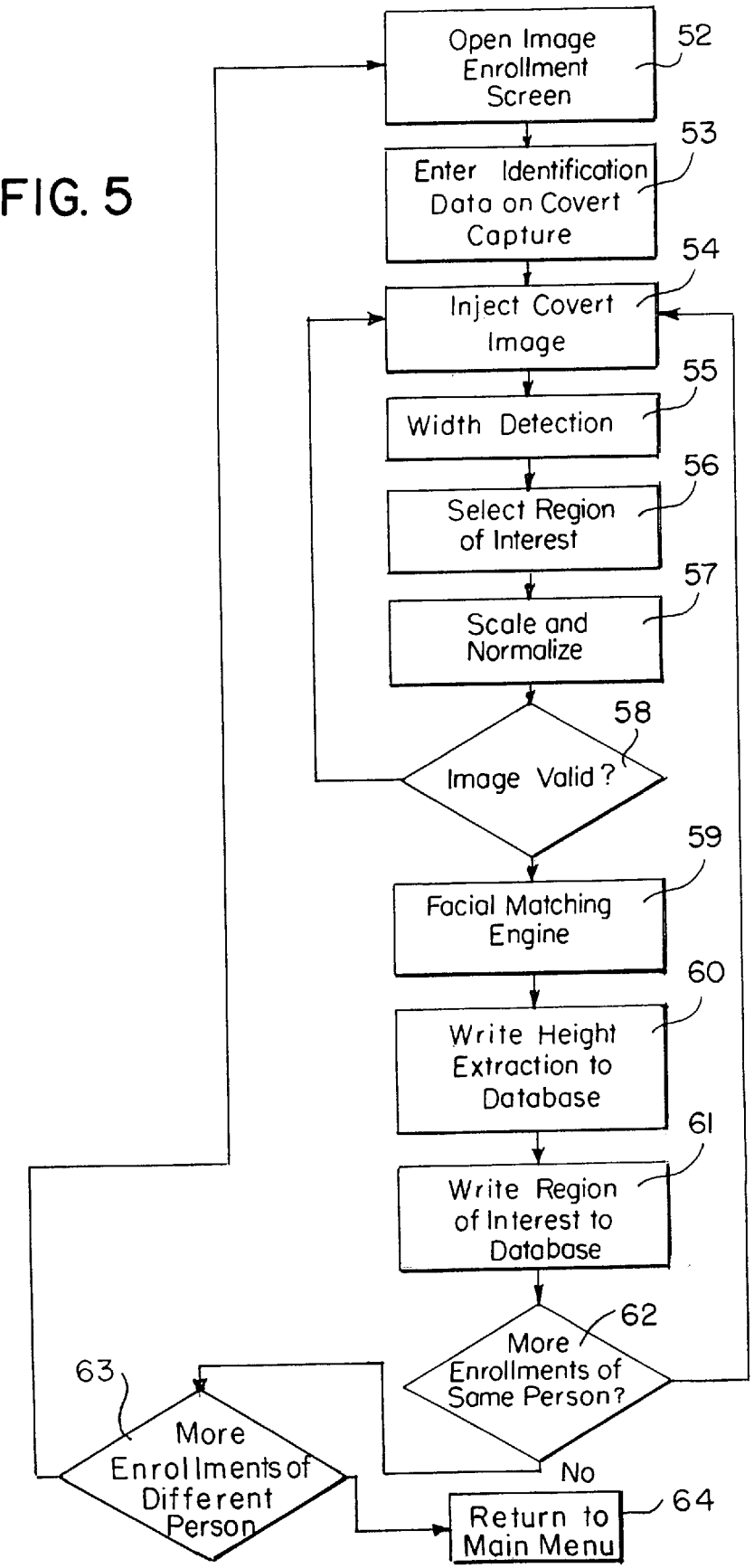
FIG. 5 is a flow chart illustrating enrollment of a facial image to be used in the surveillance detection mode.

The enrollment of image information for use in the covert/surveillance mode will be described in further detail with reference to FIG. 5. An image information enrollment screen is opened at step 52 by the operator in order to enter demographic data regarding the person whose image is to be covertly captured at step 53. This information should include but not be limited to the name, height, weight, hair color, alias, and criminal record. The operator then injects the covertly obtained image into the system at step 54. Most likely, this image will be one that was obtained without the person's consent. This image can be taken using the system camera or may be obtained from another source. For example, a frame capture from a video tape can be used. In an embodiment in which the system uses infrared facial thermograms to compare image data with a reference image, the covert image must be taken from an infrared camera of sufficient spatial and thermal resolution, such as a Flir PRISM DS starting-array IR imager.

Once the image is entered into the system, the computer automatically begins processing it. The width detection process occurs at step 55, and a region of interest is selected at step 56. The region of interest for a covertly obtained image is the same as the region of interest for a voluntarily obtained image. The system then scales, rotates and normalized the region of interest at step 57 to account for inevitable differences in distance from the camera and head-tilt and angle.

The system then determines whether the information gathered from the image scan is acceptable at step 58. If the image is found to be invalid, the system allows the operator to inject another covert image at step 54. The region of interest is input to the facial matching engine at step 59. The person's height is written to the database at step 60. Height therefore becomes an indicator to be compared with new height using a new position when in surveillance mode. The height is determined based on the height of the camera, the distance of the person to the camera, and the angle of the camera used to position the head in the center of the image space. The location of the region of interest and the image information from the facial matching engine are written to the database at step 61.

The operator may then choose to obtain more enrollment image information for the same person at step 62. The system works nominally with image information from three covertly obtained images of a person for comparison purposes. The operator then may select the option to enroll image information for a different person at step 63. If the operator seeks to enroll image information for a different person into the database, the system returns to the image information enrollment screen at step 52. If or when the image information enrollment process is complete, the system returns to the main menu at step 64.

After persons are enrolled such that the system has members in its database to search, the system can be utilized in the clearance access mode. The operation of the system in the clearance access mode will be described in further detail with reference to FIG. 6.

Upon entering clearance access mode, and at periodic intervals of non-use thereafter, the camera servo subsystem is synchronized to the home, or default, position at step 65. The system then waits for a person desiring clearance. The person who desires clearance is first prompted to enter the assigned personal identification number ("PIN") at step 66. If the identification number does not correspond to one entered into the clearance access database, the system re-queries for a PIN at step 67. Upon the entry of an acceptable PIN, the system then gathers the data corresponding to the PIN at step 68. This data may include, for example, the name, address, clearance level, etc., that was entered as described in FIG. 3, step 30.

The system then prepares the camera to scan a new image of the person to compare with the reference data. The information regarding camera positioning is downloaded at step 69. The camera is then automatically positioned based upon the downloaded information at step 70.

If the camera positioning is not acceptable for image capture at step 71, the camera position is automatically adjusted at step 72 until the face is centered. The image is captured at step 73, at which point the system begins processing the image. The system extracts the information pertaining to the head at step 74 and scales the data to a standard format at step 75. A region of interest is then extracted from the head data at step 76. The method of extraction set forth in U.S. Pat. No. 5,163,094, the disclosure of which is incorporated herein by reference, may be employed. However, it is contemplated that any extraction technique can be used. The region of interest is input to the facial matching engine at step 77.

The system then compares the image information for the person seeking clearance access with the stored image information of all persons enrolled in the database in the comparison process at step 78. The comparison process can be part of the facial matching engine or any conventional process which can quickly compare the stored image information to the image information of the person seeking clearance access.

The output of the comparison process is a sorted match list received at step 79. The sorted match list contains names of people enrolled in the database whose images most closely match the image of the person seeking to gain access in rank order (ordered by match likelihood, or goodness of fit). The PIN entered by the person seeking access is then compared to the PINs of the people on the rank ordered list at step 80. If a match is found, the system generates a signal to grant access to that person at step 81.

A second embodiment of the clearance access mode will be described with reference to FIG. 7. Upon entering clearance access mode, and at periodic intervals of non-use thereafter, the camera servo subsystem is synchronized to the home, or default, position at step 82. The system then waits for a person desiring clearance. The person who desires clearance is prompted to enter their assigned PIN at step 83. If the identification number does not correspond to one entered into the clearance access database, the system re-queries for a PIN at step 84. Upon the entry of an acceptable PIN, the system gathers the data corresponding to the PIN at step 85. This data includes the name, address, level of clearance, etc., that was entered as described in FIG. 3, step 30.

The system then prepares the camera to scan a new image of the person to compare with the reference data. The information regarding camera positioning is downloaded at step 86. The camera is then automatically repositioned based upon the downloaded information at step 87.

Before an image is captured, the system must automatically decide at step 88 whether the camera is to be adjusted at step 89 to center the image to be captured. The image is captured at step 90, at which point the computer begins processing and comparing the extracted data with the reference enrollment data. The system first locates the head at step 91. Then the system analyzes the data to locate the center of the face. While not necessary, providing this step adds to the accuracy and dependability of the system by assuring that the exact same region of interest is taken for comparison. The center of the face option particularly improves the accuracy with which the system can recognize or identify individuals with facial characteristics, such as glasses or facial hair, that can serve to act as a disguise.

Locating the center of thermal mass is one method for determining the facial center. Because hair, beards, glasses, the size of one's neck, and the cut of clothing around one's neck affect the amount of skin showing before the camera, the center of thermal mass can vary. A method for determining the center of the face must be able to compensate for these variations.

One method used to determine the facial center is signature analysis, as set forth in U.S. Pat. No. 5,163,094, which uses a base point for the determination. This base point typically is the center of the bridge of the nose. However, that system can only use this point if the person to be scanned is not wearing glasses, which obstruct a thermal reading of that area.

In a system that compensates for eyeglasses, locating the bridge of the nose can be accomplished by employing techniques similar to those taught by Dr. Pentland. Specifically, the pupils used in Dr. Pentland's method are replaced by the geometric center of each eyeglass lens. The bridge of the nose is located on the midpoint of the horizontal line connecting the two geometric lens centers. This method is particularly effective when used with infrared thermograms because problems associated with finding the geometric center of clear lenses encountered in the visual domain are avoided.

The facial center can also be determined by focusing upon two sets of symmetrical major arteries that run from the forehead, between and outside the eyes, and around the nose mouth. By taking readings of the location of the arteries through a thermal scan, the system can determine the location of the center of the face by determining the derivative of the change in direction between these arteries.

After locating the center of the face at step 92, the system then scales the data to a standard format at step 93, and normalizes this data at step 94. A region of interest is then extracted at step 95. The region of interest in input to the facial matching engine at step 96.

The system then accesses at step 97 a class table of image information for other persons in the class to which the PIN entered at step 83 is assigned. Classes are defined for different gender and racial groups to account for differences in facial features. For example, one class may be defined to consist of Caucasian females, a second of oriental males, etc. The class for each enrolled PIN is entered along with the other information entered at step 30. The use of classes enhances the reliability of the facial matching engine by ensuring that the captured image is compared to other images with the same general facial features.

Reliability can be further enhanced by doping a class. Doping a class is the process of adding additional images of persons other than those expected to use the to the database for each defined class. For a given imaging techniques (e.g. infrared) and desired identification accuracy, a minimum number of images for comparison purposes is required. If the number of system users in any class is less than this minimum, the desired identification accuracy for that class will not be possible without doping that class.

These concepts can best be understood in relation to a hypothetical small company. This company employs 100 people, 10 of whom have oriental facial features. Of these 10, 5 are females. In a system not using class definition and doping, the probability of a match being declared for any oriental female entering a PIN assigned to an oriental female employee would be high. In a system employing class definition and doping, the oriental female class can be doped to hold a large number of images. The captured image would then be compared to a large number of images in that particular class, thereby greatly reducing the probability of identification error.

The captured image information is compared to other image information in the class table in the comparison process at step 98. The output from the comparison process is a rank ordered match list received at step 99. This match list is then further correlated against the PIN entered by the person seeking clearance access at step 100. If the PIN of the person who seeks,to gain access matches that of the first person on the sorted match list, it is highly likely that the person's purported identity is genuine. Lastly, a positive identification may be made at step 101, with the system sending a signal to indicate this result.

The operator can choose to use the facial recognition system in the surveillance mode to detect unwanted persons and generate a signal to indicate their presence. The operation of the system in the surveillance mode will be described with reference to FIG. 8.

In the surveillance mode, the system runs through a continuous loop to scan an area for a personal presence at step 102. A personal presence can be detected by a human present on site, by using the system camera to send images to a human operator at a remote location, with motion detectors, or with any other system which can detect a personal presence. As an example, at an airport security gate, the system may be operated by a security guard who scans an image of every person who desires to enter the airport terminal. In a company or military building, the device might automatically be triggered to scan persons who walk by the camera by a motion detector without a human security guard to direct the system.

When a personal presence is detected, the camera is positioned to scan an image of a person's face at step 103. The camera is positioned automatically in unmanned systems with movable cameras. It will be appreciated by those skilled in the art that a non-movable camera may also be used. In this case, the system sensors can be arranged to signal the system to capture an image when the subject is at a distance such that the head will be present in the image. The image is then captured at step 104 and placed in memory.

The computer processes the image using steps common to the clearance access mode. The system locates the head in memory space at step 105, the information is scaled at step 106, a region of interest is extracted at step 107, and the image data is processed by a facial matching engine at step 108. A rank ordered match list is then generated by the comparison process at step 109 and received at step 110.

In the surveillance mode, it is possible that the person scanned is not one of the persons in the database. For example, in an airline security system which has a database of known terrorists, it is highly unlikely that a particular person scanned is provided for in the database. Therefore, while the sorted match list will generate a list that indicates that the person scanned is more alike one particular person within the database than all others, it is likely that the person scanned is not the person the system indicates. Thus, in addition to providing the match list, the system provides an evaluation by "goodness of fit", or likelihood that the person scanned is the person indicated at step 110. This result can be expressed as a number value or a percentage. As an example, a person who is scanned in the surveillance mode might be found to have facial properties more alike a particular terrorist or criminal than any other person on the database. A second value, however, might show that there is only a 3 percent likelihood that this person scanned is this terrorist. The system can be programmed to sound an alarm or yield an indicator only when the percentage of likelihood is above a certain threshold.

What is claimed:

1. A method for identifying individuals comprising the steps of:
    (a) enrolling data information regarding a person into a database and assigning an identification number corresponding to a database location in a plurality of database locations;
    (b) synchronizing a servo motor subsystem in an image scanning camera to a default position;
    (c) positioning said camera such that said image information is centered;
    (d) capturing an image into computer memory, scaling said image, and determining the validity of said image for use in later identification;
    (e) writing servo motor camera positioning location information and selected region of interest information to said database location;
    (f) obtaining a personal identification number from a person;
    (g) checking said personal identification number against a set of personal identification numbers that correspond to said plurality of database locations;
    (h) scanning image information of a person and processing said image information by extracting a region of interest;
    (i) comparing said scanned image region of interest with said enrolled image regions of interest located in said plurality of database locations;
    (j) generating a sorted match list which provides a list of persons enrolled in said database in the order of the likelihood that the person whose image was scanned is that person enrolled in said database; and
    (k) correlating a personal identification number corresponding to a database location of the listing of a person in said sorted match list who is most likely said person whose image was enrolled with the personal identification number provided by the person whose image was scanned.

2. A method for identifying individuals comprising the steps of:
    (a) enrolling data information regarding a person into a database and assigning an identification number corresponding to a database location in a plurality of database locations;
    (b) enrolling image information regarding said person and processing said image information by extracting a region of interest;
    (c) obtaining a personal identification number from a person;
    (d) checking said personal identification number against a set of personal identification numbers that correspond to said plurality of database locations;

(e) obtaining camera positioning information based upon previously enrolled image information in a database location associated with said personal identification number;

(f) positioning a camera such that the face of a person to be scanned is properly centered for a valid image capture;

(g) capturing an image into computer memory and scaling said image;

(h) comparing said scanned image region of interest with said enrolled image regions of interest located in said plurality of database locations;

(i) generating a sorted match list which provides a list of persons enrolled in said database in the order of the likelihood that the person whose image was scanned is that person enrolled in said database; and (j) correlating a personal identification number corresponding to a database location of the listing of a person in said sorted match list who is most likely said person whose image was enrolled with the personal identification number provided by the person whose image was scanned.

3. A method for identifying individuals comprising the steps of:

(a) positioning a camera to scan image information from at least one person whose identity is known;

(b) enrolling image information from the at least one person whose identity is known into a database of a plurality of images;

(c) enrolling corresponding data information from the at least one person whose identity is known into the database, the data information comprising camera positioning information and a personal identification number;

(d) accepting a proposed personal identification number from a person whose identity is not known;

(e) recalling camera positioning information from the database based on the proposed personal identification number;

(f) positioning a camera to scan image information from the person whose identity is not known based on the recalled camera positioning information;

(g) scanning image information from the person whose identity is not known;

(h) comparing image information corresponding to the person whose identity is not known to image information corresponding to the at least one person whose identity is known from the database.

4. The method according to claim 3, wherein the camera is positioned such that the face of a person to be scanned is properly centered for a valid image capture.

5. An apparatus for identifying individuals comprising:

a camera;

means for positioning the camera to scan image information from at least one person whose identity is known;

means for enrolling image information from the at least one person whose identity is known into a database of a plurality of images;

means for enrolling corresponding data information from the at least one person whose identity is known into the database, the data information comprising camera positioning information and a personal identification number;

means for accepting a proposed personal identification number from a person whose identity is not known;

means for recalling camera positioning information from the database based on the proposed personal identification number;

means for positioning the camera to scan image information from the person whose identity is not known based on the recalled camera positioning information;

means for scanning image information from the person whose identity is not known;

means for comparing image information corresponding to the person whose identity is not known to image information corresponding to the at least one person whose identity is known from the database.

6. The apparatus according to claim 5, wherein the camera is positioned such that the face of a person to be scanned is properly centered for a valid image capture.

* * * * *